(12) United States Patent
Kitada et al.

(10) Patent No.: US 12,600,460 B2
(45) Date of Patent: Apr. 14, 2026

(54) PROPELLER

(71) Applicant: EXEDY Corporation, Neyagawa (JP)

(72) Inventors: Tatsuki Kitada, Neyagawa (JP);
Mitsuru Kuwahata, Neyagawa (JP);
Masahiro Ohno, Neyagawa (JP);
Yasunori Kunisaki, Neyagawa (JP)

(73) Assignee: EXEDY CORPORATION, Neyagawa
(JP)

( * ) Notice: Subject to any disclaimer, the term of this
patent is extended or adjusted under 35
U.S.C. 154(b) by 18 days.

(21) Appl. No.: 19/183,289

(22) Filed: Apr. 18, 2025

(65) Prior Publication Data

US 2025/0333160 A1 Oct. 30, 2025

(30) Foreign Application Priority Data

Apr. 25, 2024 (JP) ................................. 2024-071322

(51) Int. Cl.
*B64C 11/28* (2006.01)
*B64C 11/04* (2006.01)
*B64C 27/50* (2006.01)
*B64U 30/293* (2023.01)

(52) U.S. Cl.
CPC .............. *B64C 11/28* (2013.01); *B64C 11/04*
(2013.01); *B64C 27/50* (2013.01); *B64U*
*30/293* (2023.01)

(58) Field of Classification Search
CPC ......... B64C 11/04; B64C 11/28; B64C 27/50;
B64U 30/293
See application file for complete search history.

(56) References Cited

U.S. PATENT DOCUMENTS

| | | | | |
|---|---|---|---|---|
| 4,252,504 | A | * 2/1981 | Covington | .............. B64C 27/50 |
| | | | | 416/221 |
| 10,689,103 | B2 | * 6/2020 | Holik | ..................... A63H 27/12 |
| 11,541,996 | B2 | * 1/2023 | Kim | ........................ B64C 11/20 |

FOREIGN PATENT DOCUMENTS

| | | | |
|---|---|---|---|
| JP | 2023-184048 A | 12/2023 | |
| WO | WO-2018172754 A1 | * 9/2018 | ............. B64C 11/28 |

* cited by examiner

*Primary Examiner* — Sang K Kim
(74) *Attorney, Agent, or Firm* — United IP Counselors,
LLC

(57) ABSTRACT

A propeller designed to prevent unintentional folding of the
blades includes a hub, a blade, a first engaging portion, and
a second engaging portion. The blade is attached to the hub
to be radially movable with respect thereto. The blade is
attached to the hub to be pivotable with respect thereto. The
first engaging portion is provided in the hub. The second
engaging portion is provided in the blade. The second
engaging portion is configured to be engaged with the first
engaging portion to restrict the blade from pivoting with
respect to the hub when the blade is moved radially outward.
The second engaging portion is configured to be disengaged
from the first engaging portion when the blade is moved
radially inward.

14 Claims, 9 Drawing Sheets

PROPELLER

CROSS-REFERENCE TO RELATED APPLICATIONS

This application is based on and claims the priority benefit of application No. 2024-071322 filed on Apr. 25, 2024, the contents of which are incorporated herein by reference.

TECHNICAL FIELD

The claimed invention relates to a propeller, e.g., one that is useful for drones.

BACKGROUND

A type of propeller to be used for a drone and so forth includes a hub and blades (see e.g., Japan Laid-open Patent Application Publication No. 2023-184048). The blades are fastened to the hub by bolts and so forth. The blades, kept folded in a nonrotating state of the propeller, are configured to be unfolded by centrifugal forces when the rotation of the propeller starts. In other words, the forces exerted by the bolts to fasten the blades to the hub are adjusted to make the blades pivotable with respect to the hub.

In such a type of propeller as described above, there is a concern that the blades may unintentionally fold (at least partially) due to acceleration, deceleration, and so forth of the propeller in the rotating state. It should be noted that the unintentional folding of the blades can cause drawbacks such as response delay, deterioration in controllability, electric consumption, etc.

SUMMARY OF THE INVENTION

It is an object of embodiments of the claimed invention to prevent a blade from being unintentionally folded.

A propeller according to a first aspect includes a hub, a blade, a first engaging portion, and a second engaging portion. The blade is attached to the hub to be radially movable with respect thereto. The blade is attached to the hub to be pivotable with respect thereto. The first engaging portion is provided in the hub. The second engaging portion is provided in the blade. The second engaging portion is configured to be engaged with the first engaging portion to restrict the blade from pivoting with respect to the hub when the blade is moved radially outward. The second engaging portion is configured to be disengaged from the first engaging portion when the blade is moved radially inward.

According to the configuration, when the propeller is rotated, the blade is moved radially outward by centrifugal forces; hence, the first and second engaging portions are engaged with each other. As a result, the blade is restricted from pivoting with respect to the hub, whereby it is made possible to prevent the blade from being unintentionally folded. It should be noted that the first and second engaging portions are disengaged from each other by moving the blade radially inward when the propeller stops rotating, whereby it is made possible to fold the blade.

A propeller according to a second aspect relates to the propeller according to the first aspect and is configured as follows. The hub includes an upper hub portion. The upper hub portion is disposed on an upper side of the blade.

A propeller according to a third aspect relates to the propeller according to the second aspect and is configured as follows. The first engaging portion is provided in the upper hub portion.

A propeller according to a fourth aspect relates to the propeller according to the second or third aspect and is configured as follows. The hub includes a lower hub portion disposed on a lower side of the blade.

A propeller according to a fifth aspect relates to the propeller according to any of the first to fourth aspects and is configured as follows. The first engaging portion is provided in the hub as one of a recess and a protrusion. The second engaging portion is provided in the blade as the other of the recess and the protrusion.

A propeller according to a sixth aspect relates to the propeller according to the fifth aspect and is configured as follows. The recess includes a pair of inner wall surfaces opposed to each other. The pair of inner wall surfaces slants to gradually separate from each other toward the protrusion.

A propeller according to a seventh aspect relates to the propeller according to any of the first to sixth aspects and further includes a rotary shaft. The rotary shaft axially extends from one of the hub and the blade. The other of the hub and the blade includes an elongated hole. The elongated hole radially extends. The elongated hole guides the rotary shaft such that the rotary shaft is made radially movable.

A propeller according to an eighth aspect relates to the propeller according to the seventh aspect and is configured as follows. The rotary shaft axially extends from the hub. The blade includes the elongated hole.

A rotorcraft according to a ninth aspect includes the propeller recited in any of the first to eighth aspects and a prime mover configured to rotate the propeller.

According to the claimed invention, it is made possible to prevent a blade from being unintentionally folded while the propellor of which it is a part is rotating.

DETAILED DESCRIPTION

A rotorcraft 100 and a propeller 105 according to the presently preferred embodiment will be hereinafter explained with reference to the drawings. It should be noted that in the following explanation, the term "axial direction" refers to an extending direction of a rotational axis O of the propeller 105. On the other hand, the term "circumferential direction" refers to a circumferential direction of an imaginary circle about the rotational axis O, whereas the term "radial direction" refers to a radial direction of the imaginary circle about the rotational axis O.

\<Rotorcraft\>

Figure 1:
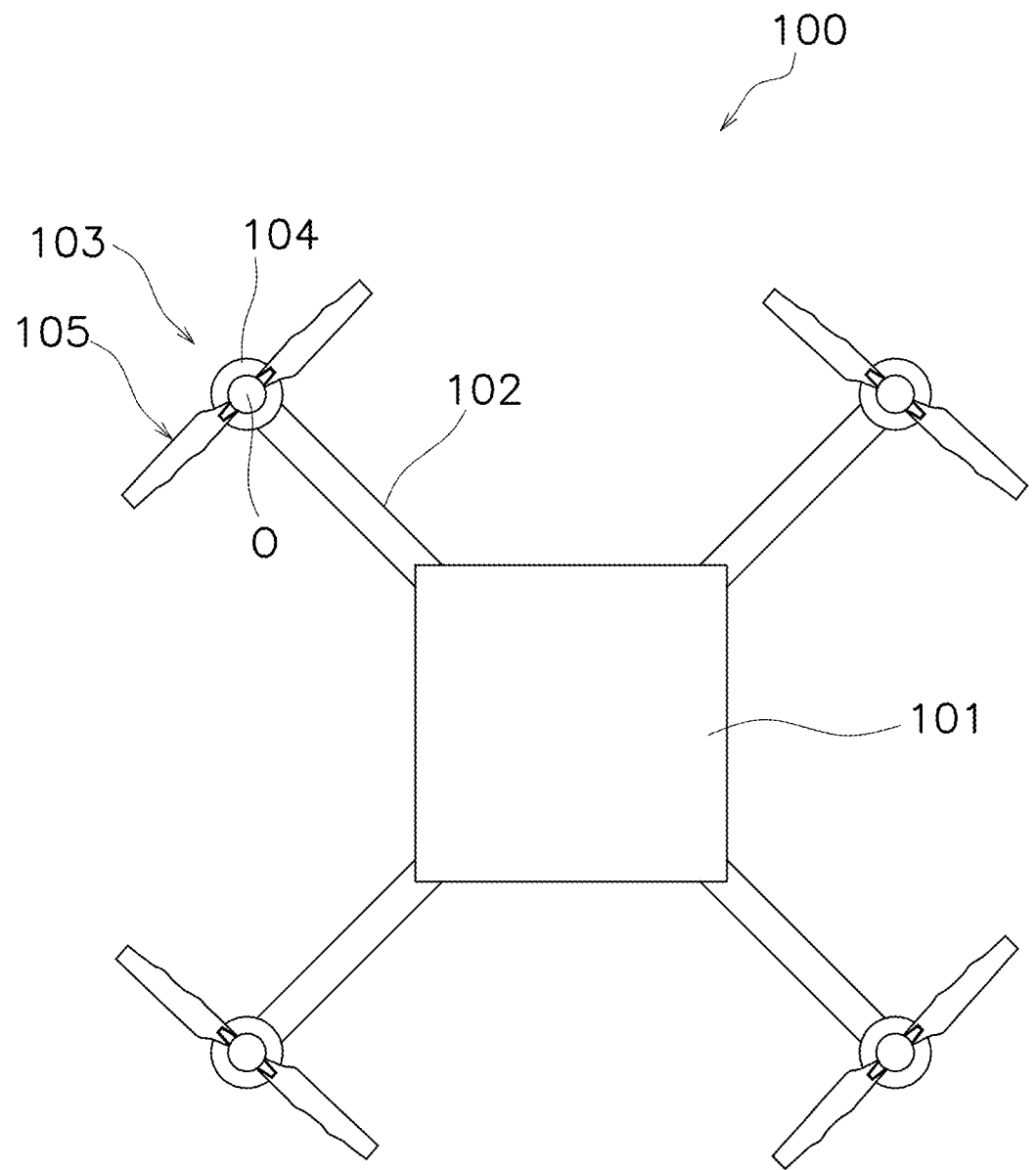
FIG. 1 is a plan view of a rotorcraft.

As shown in FIG. 1, the rotorcraft 100 includes a body 101, a plurality of arms 102, and a rotor 103 at the end of each arm 102. Each rotor 103 includes an electric motor 104

(exemplary prime mover) and the propeller 105. It should be noted that in the presently preferred embodiment, the rotorcraft 100 includes four rotors 103. In other words, in the presently preferred embodiment, the rotorcraft 100 is a drone of a multi-copter type.

The body 101 includes a battery (omitted in the illustration), a control unit (omitted in the illustration), and so forth. The arms 102 extend from the body 101 in a radial direction. Each rotor 103 is attached to the distal end of each arm 102.

The electric motor 104 is configured to rotate the propeller 105. It should be noted that the rotational direction of each electric motor 104 is uniquely set. For example, in FIG. 1, the electric motor 104 in the right upper rotor 103 and that in the left lower rotor 103 are rotated clockwise, whereas the electric motor 104 in the left upper rotor 103 and that in the right lower rotor 103 are rotated counterclockwise.

<Propeller>

Figure 2:
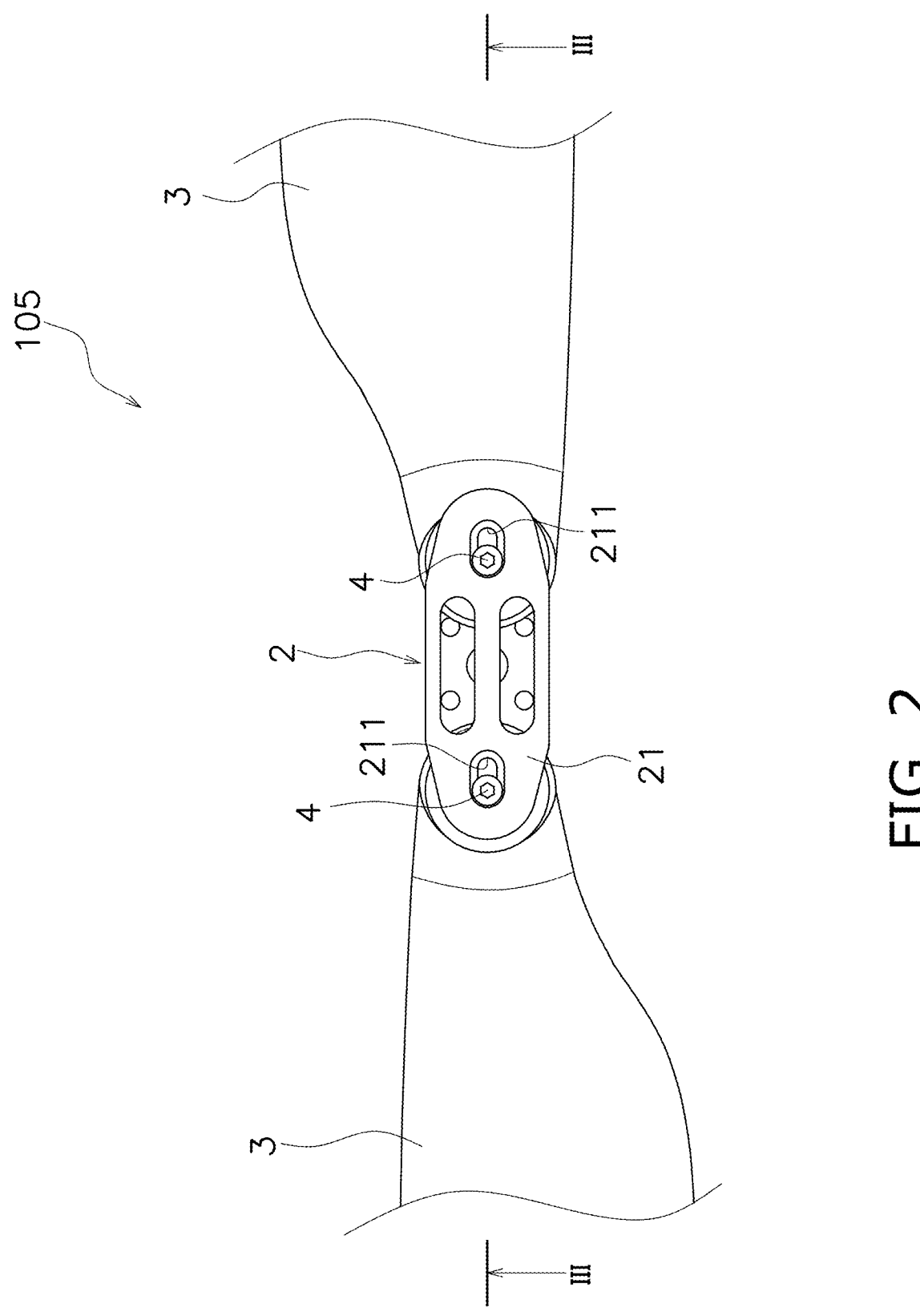
FIG. 2 is a plan view of a propeller focused on the central, hub region thereof.
Figure 3:
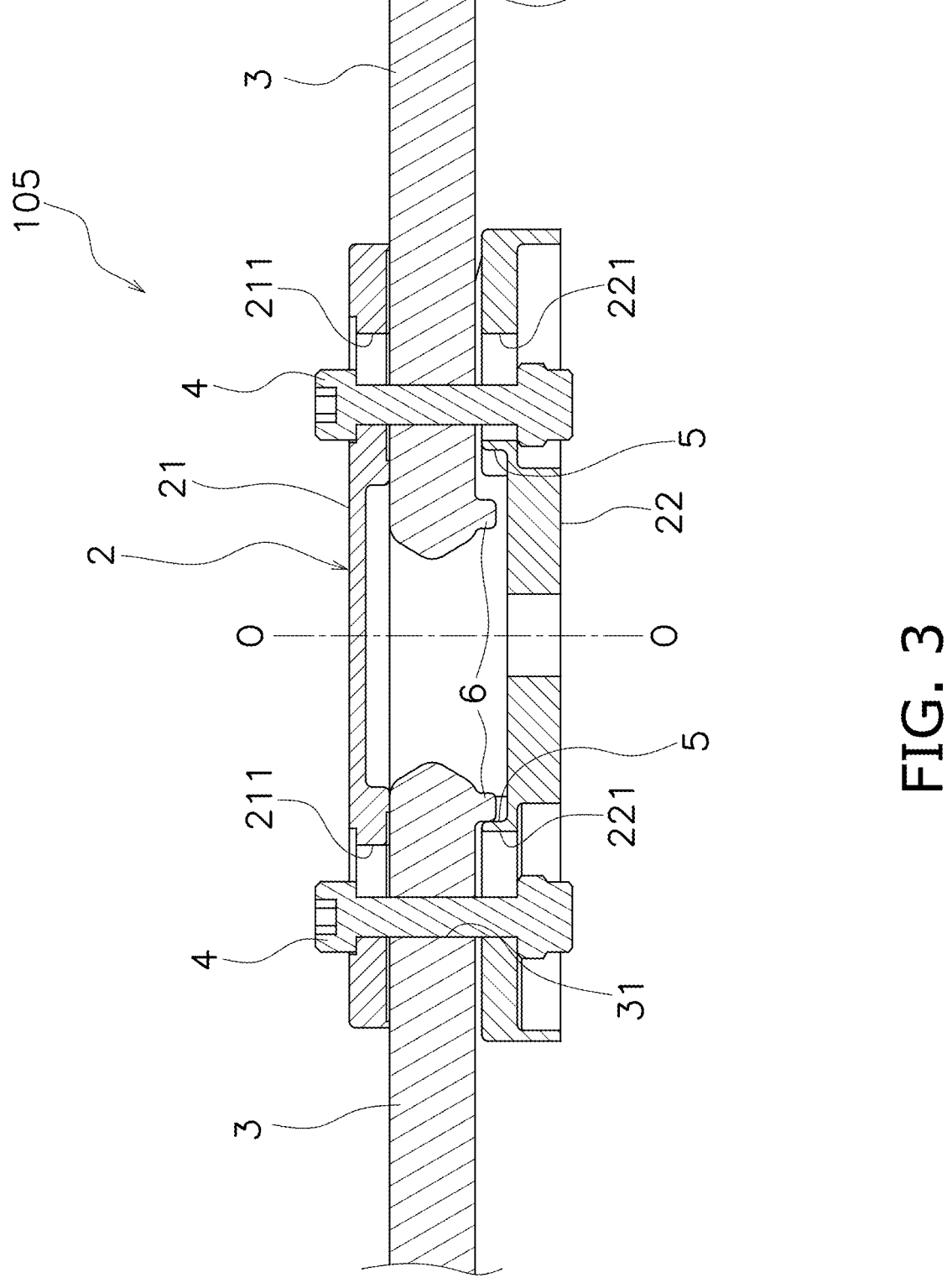
FIG. 3 is a cross-sectional view of the propeller hub region taken along line III-III in FIG. 2.

FIG. 2 is a plan view of the central, hub region of the propeller 105, whereas FIG. 3 is a cross-sectional view of the central, hub region of the propeller 105 taken along line II-II in FIG. 2. It should be noted that in FIGS. 2 and 3, the blade 3 on the right side of the figure is illustrated in state where the blades 3 have been moved radially inward, whereas the blade 3 on the left side of the figure is illustrated in a state where the blades 3 have been moved radially outward.

As shown in FIGS. 2 and 3, the propeller 105 includes a hub 2, a pair of blades 3, and a pair of bolts 4 (exemplary pivot shaft) by which the blades 3 are pivotally attached to the hub 2.

<Hub>

The hub 2 is attached to the electric motor 104. When described in detail, the hub 2 is attached to a rotor of the electric motor 104. Because of this, the hub 2 is disposed to be rotated by the electric motor 104. Additionally, the hub 2 supports the blades 3.

The hub 2 includes an upper hub portion 21 and a lower hub portion 22. The upper hub portion 21 is disposed on the upper side of the blades 3. The lower hub portion 22 is disposed on the lower side of the blades 3. In other words, the blades 3 are interposed between the upper and lower hub portions 21 and 22 in an up-and-down direction. The upper and lower hub portions 21 and 22 are fastened to each other by the pair of bolts 4. The lower hub portion 22 is attached to the electric motor 104 by a plurality of bolts (omitted in the illustration) and so forth.

The upper hub portion 21 includes a pair of elongated holes (i.e., slots) 211. Each elongated hole 211 radially extends. The lower hub portion 22 includes a pair of elongated holes (i.e., slots) 221. Each elongated hole 221 radially extends. When seen in the axial direction, the elongated holes 211 of the upper hub portion 21 and the elongated holes 221 of the lower hub portion 22 overlap with each other. The width of each elongated hole 211, 221 is approximately equal in dimension to the diameter of each bolt 4.

<Blades>

The blades 3 radially extend from the hub 2. Each blade 3 is attached at the base end thereof to the hub 2. Each blade 3 includes a through hole 31 in the base end thereof. Each bolt 4 extends to penetrate the through hole 31. In other words, each bolt 4 axially extends from each blade 3. When described in detail, each bolt 4 extends upward and downward from each blade 3. Each bolt 4 is configured to be radially movable within its respective pair of elongated holes 211, 221, together with its associated blade 3.

Each blade 3 is pivotable with respect to the hub 2. In other words, each blade 3 is attached to the hub 2 in a manner that lets it pivot about its respective bolt 4. Each blade 3 may be pivoted together with each bolt 4, or alternatively, may be pivoted with respect to each bolt 4. It should be noted that the through hole 31 is approximately equal in diameter to each bolt 4.

Each bolt 4 is accommodated, in part, in each elongated hole 211 of the upper hub portion 21 and each elongated hole 221 of the lower hub portion 22. When described in detail, each bolt 4 is accommodated at an upper end portion thereof in the elongated hole 211 of the upper hub portion 21. Additionally, each bolt 4 is accommodated at a lower end portion thereof in each elongated hole 221 of the lower hub portion 22.

Each bolt 4 is radially movable within its respective elongated hole 211 of the upper hub portion 21 and its respective elongated hole 221 of the lower hub portion 22. Each elongated hole 211, 221 is configured to guide each bolt 4 such that each bolt 4 is made radially movable. Because of this, each blade 3 is radially movable together with its respective bolt 4 with respect to the hub 2. In other words, each blade 3 is attached to the hub 2 to be radially movable with respect thereto. When described in detail, each blade 3 is movable radially outward with respect to the hub 2 as shown in FIGS. 2 and 3 for the left-side blade 3, and is also movable radially inward with respect to the hub 2 as shown in FIGS. 2 and 3 for the right-side blade 3.

<First and Second Engaging Portions>

Figure 4:
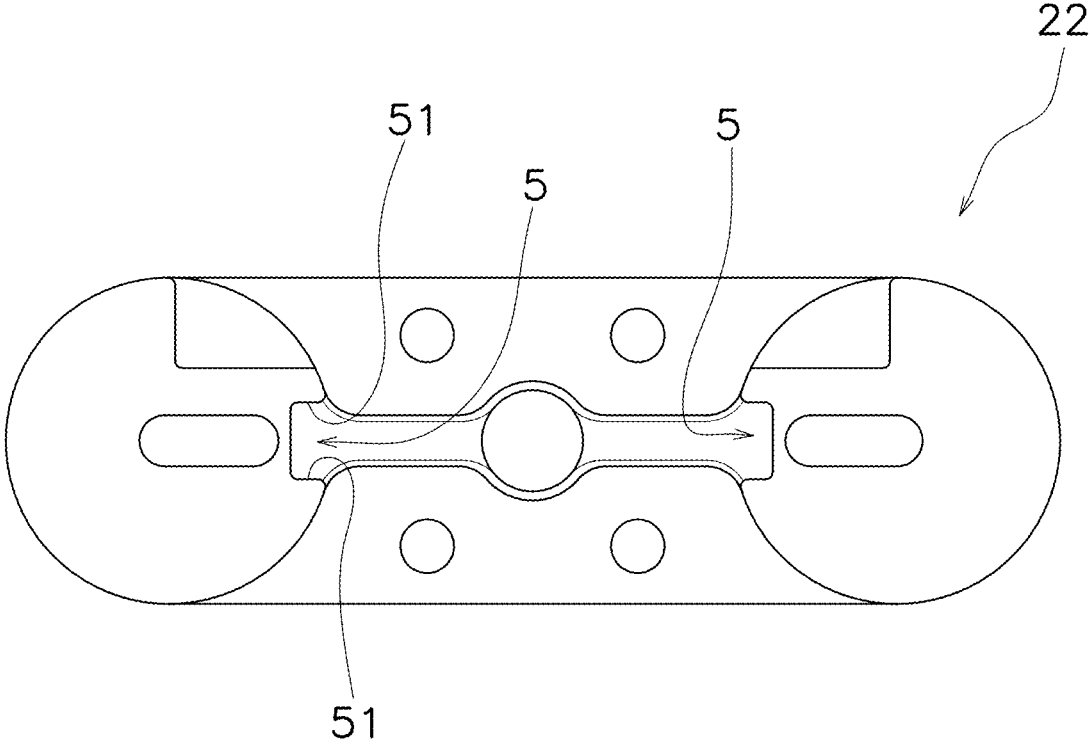
FIG. 4 is a plan view of a lower hub portion.
Figure 5:
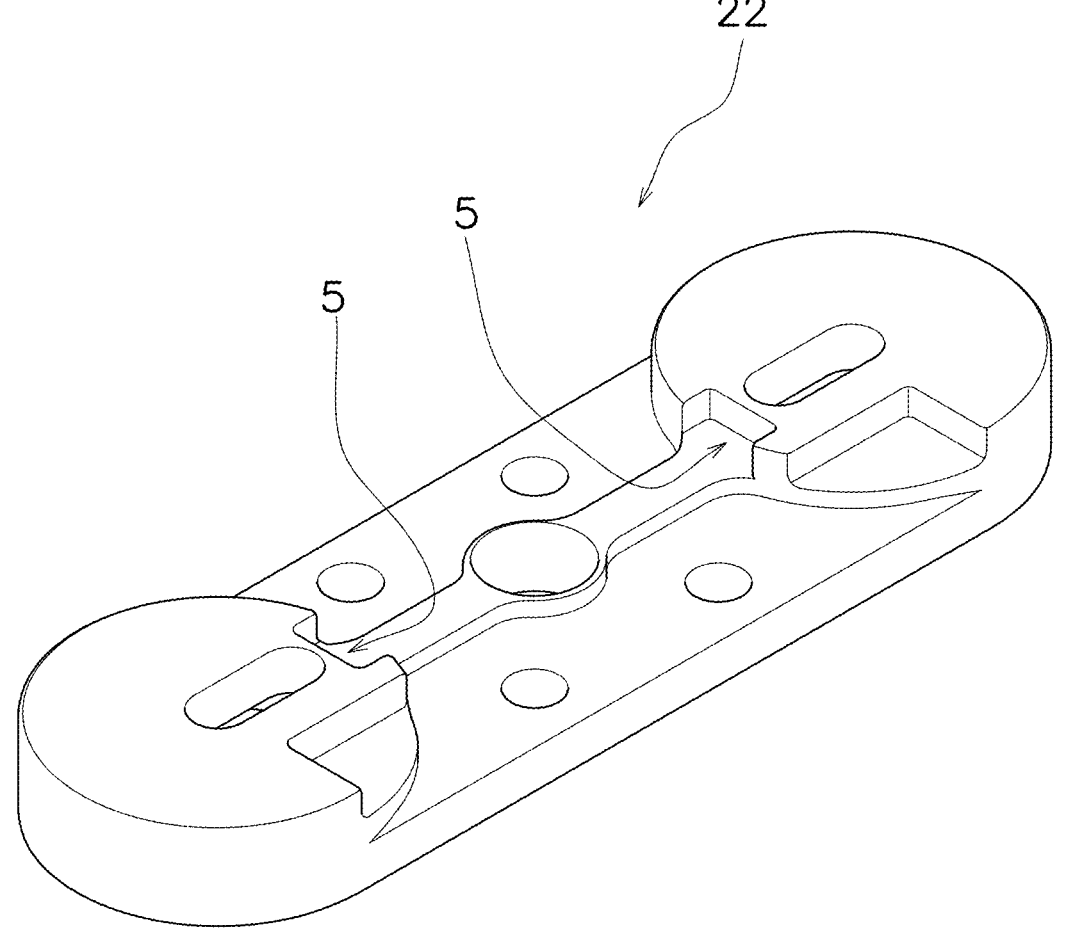
FIG. 5 is a perspective view of the lower hub portion shown in FIG. 4.
Figure 6:
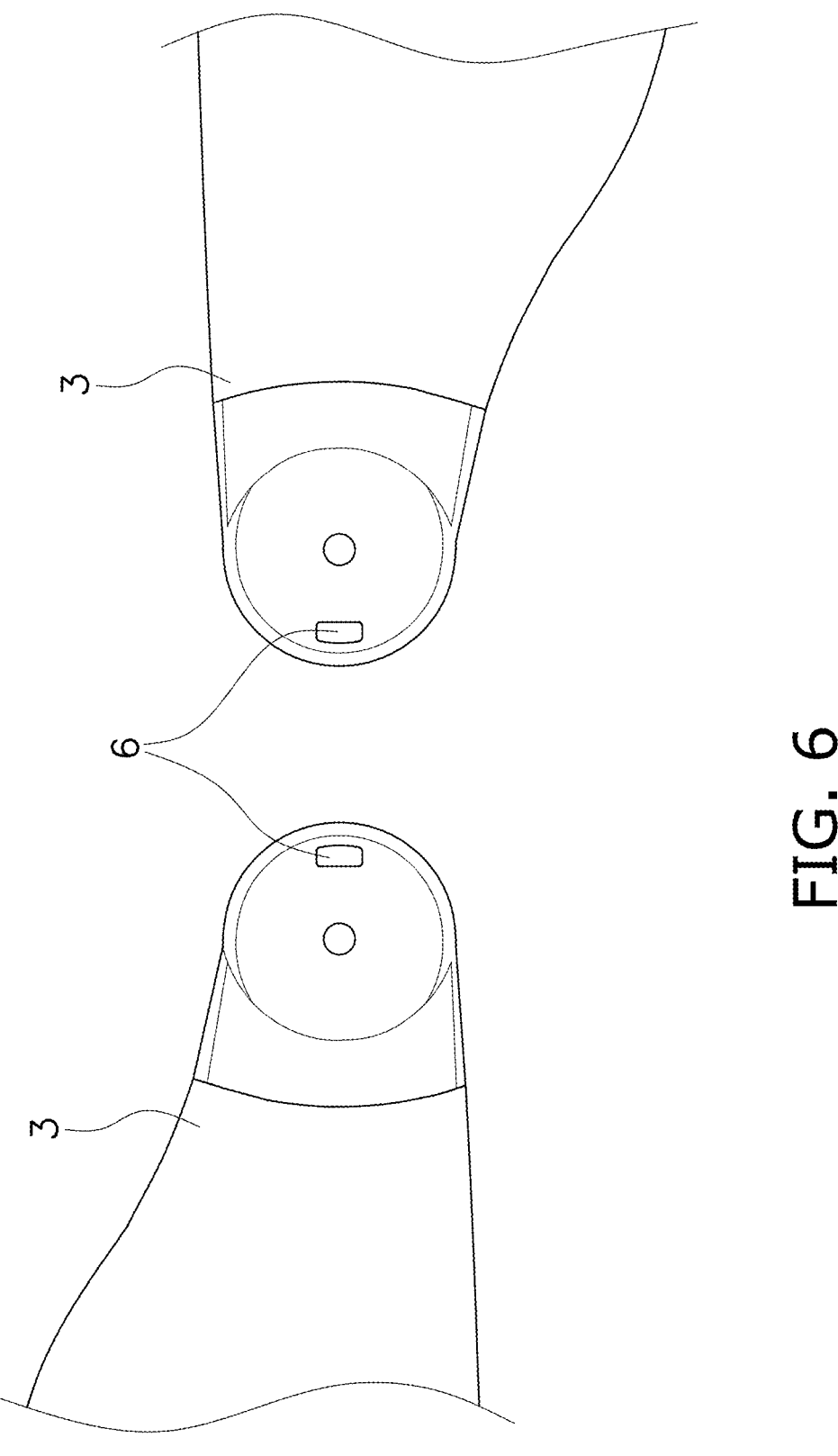
FIG. 6 is a bottom view of the hub portion of a blade.

FIG. 4 is a plan view of the lower hub portion 22; FIG. 5 is a perspective view of the lower hub portion 22; FIG. 6 is a bottom view of the pair of blades 3. As shown in FIGS. 3 to 6, the propeller 105 further includes a pair of first engaging portions 5 and a pair of second engaging portions 6.

As shown in FIGS. 3 to 5, the pair of first engaging portions 5 is provided in the hub 2. When described in detail, the pair of first engaging portions 5 is provided in the lower hub portion 22. Each first engaging portion 5 is a recess. Each first engaging portion 5 opens radially inward. It should be noted that each first engaging portion 5 opens upward as well. Each first engaging portion 5 includes a pair of inner wall surfaces 51 circumferentially opposed to each other. In this embodiment, the pair of inner wall surfaces 51 are substantially parallel to each other.

As shown in FIGS. 3 and 6, the pair of second engaging portions 6 is provided in the pair of blades 3, respectively. Each blade 3 is provided with one second engaging portion 6. Each second engaging portion 6 is a protrusion. Each second engaging portion 6 protrudes downward from each blade 3. In other words, each second engaging portion 6 protrudes toward the lower hub portion 22.

Each second engaging portion 6 is radially opposed to each first engaging portion 5. Each second engaging portion 6 is configured to be engaged with each first engaging portion 5 when the blade 3 moves radially outward. Preferably, each second engaging portion 6 is configured to be fittingly engaged with each first engaging portion 5. Referring to FIG. 3, when engaged with the first engaging portion 5, the second engaging portion 6 is configured to overlap the first engaging portion 5 when viewed in an axial direction, and when disengaged with the first engaging portion 5, the second engaging portion 6 is configured not to overlap the first engaging portion 5 when viewed in the axial direction.

When the propeller 105 is rotated, each blade 3 is applied with centrifugal forces, whereby each blades 3 is moved radially outward as shown in FIGS. 2 and 3 for the left-side blade 3. Alternatively, at the start of using the rotorcraft 100, a user moves each blade 3 radially outward. When each blade 3 is thus moved radially outward, each second engaging portion 6 is engaged with each first engaging portion 5. When each second engaging portion 6 is thus engaged with each first engaging portion 5, each blade 3 is restricted from pivoting with respect to the hub 2. In other words, when each second engaging portion 6 is engaged with each first engaging portion 5, each blade 3 is made non-pivotable with respect to the hub 2. Because of this, even when rotational acceleration or deceleration abruptly occurs during the rotation of the propeller 105, each blade 3 can be prevented from being unintentionally folded.

When the propeller 105 is retracted, the user moves each blade 3 radially inward as shown in FIGS. 2 and 3 for the right-side blade 3. When each blade 3 is thus moved radially inward, each second engaging portion 6 is disengaged from each first engaging portion 5. As a result, each blade 3 is made pivotable with respect to the hub 2. Therefore, it is made possible to fold each blade 3 by pivoting each blade 3 with respect to the hub 2, whereby the propeller 105 can be made compact.

[Modifications]

One preferred embodiment of the claimed invention has been explained above. However, the claimed invention is not limited to the above, and a variety of changes can be made without departing from the scope of the claimed invention. It should be noted that, generally speaking, respective modifications to be described are applicable simultaneously.

(a) In the preferred embodiment described above, each propeller 105 includes two blades 3. However, each propeller 105 may include only one blade 3, or alternatively, may include three or more blades 3.

Figure 7:
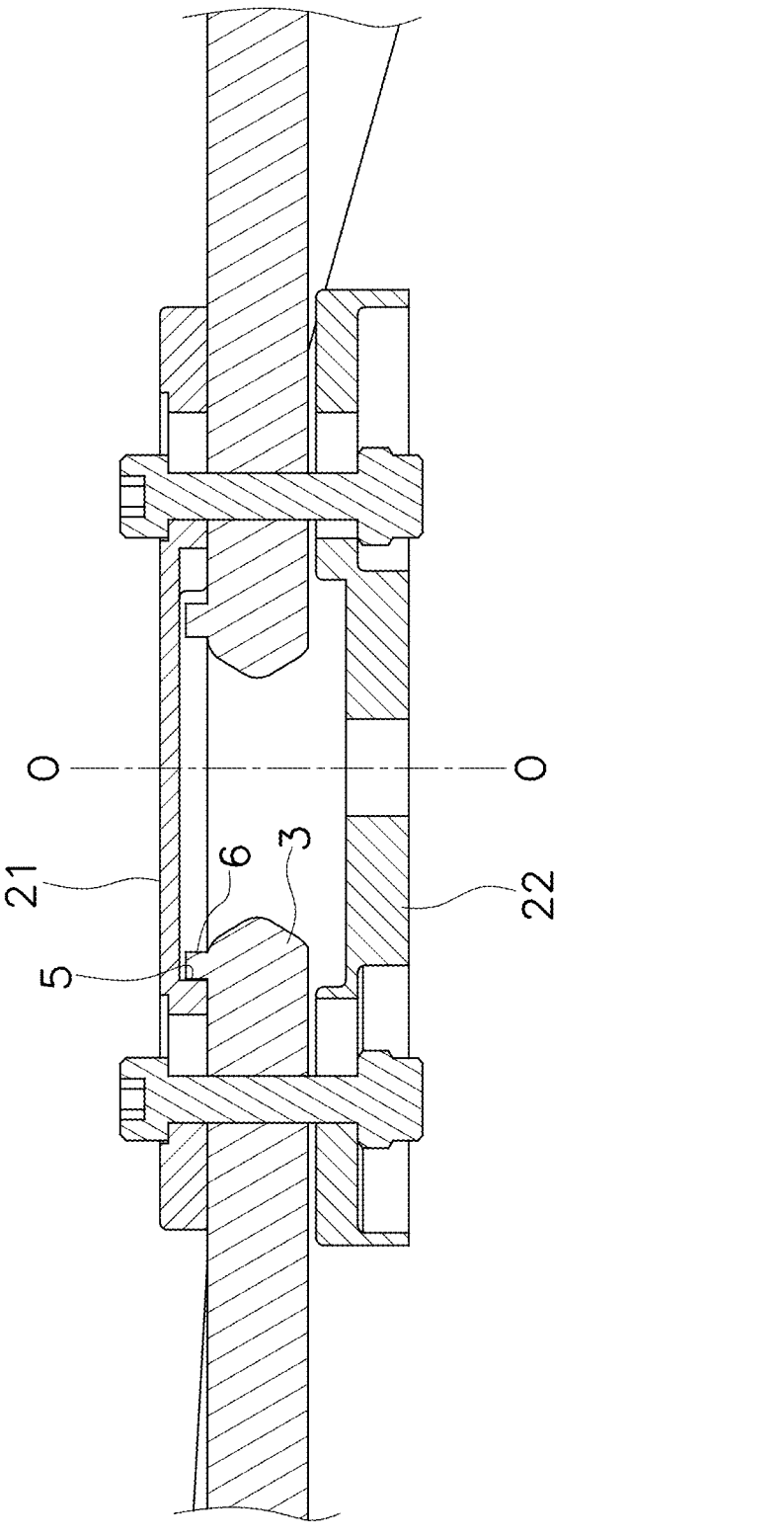
FIG. 7 is a cross-sectional view of the central, hub region of a propeller according to a modification.

(b) As shown in FIG. 7, the pair of first engaging portions 5 may be provided in the upper hub portion 21. In this case, the pair of second engaging portions 6 protrudes upward from the pair of blades 3, respectively. According to this configuration, each blade 3 is moved upward slightly when the propellor is rotated due to lift forces; hence, each first engaging portion 5 and each second engaging portion 6 can be more stably engaged with each other.

(c) In the preferred embodiment described above, each first engaging portion 5 is made in the shape of recess, whereas each second engaging portion 6 is made in the shape of protrusion. Alternatively, each first engaging portion 5 may be made in the shape of protrusion, whereas each second engaging portion 6 may be made in the shape of recess. In other words, each blade 3 may be provided with the recess, whereas the hub 2 may be provided with the protrusion. In this case, the recess, provided in each blade 3, opens radially outwardly.

Figure 8:
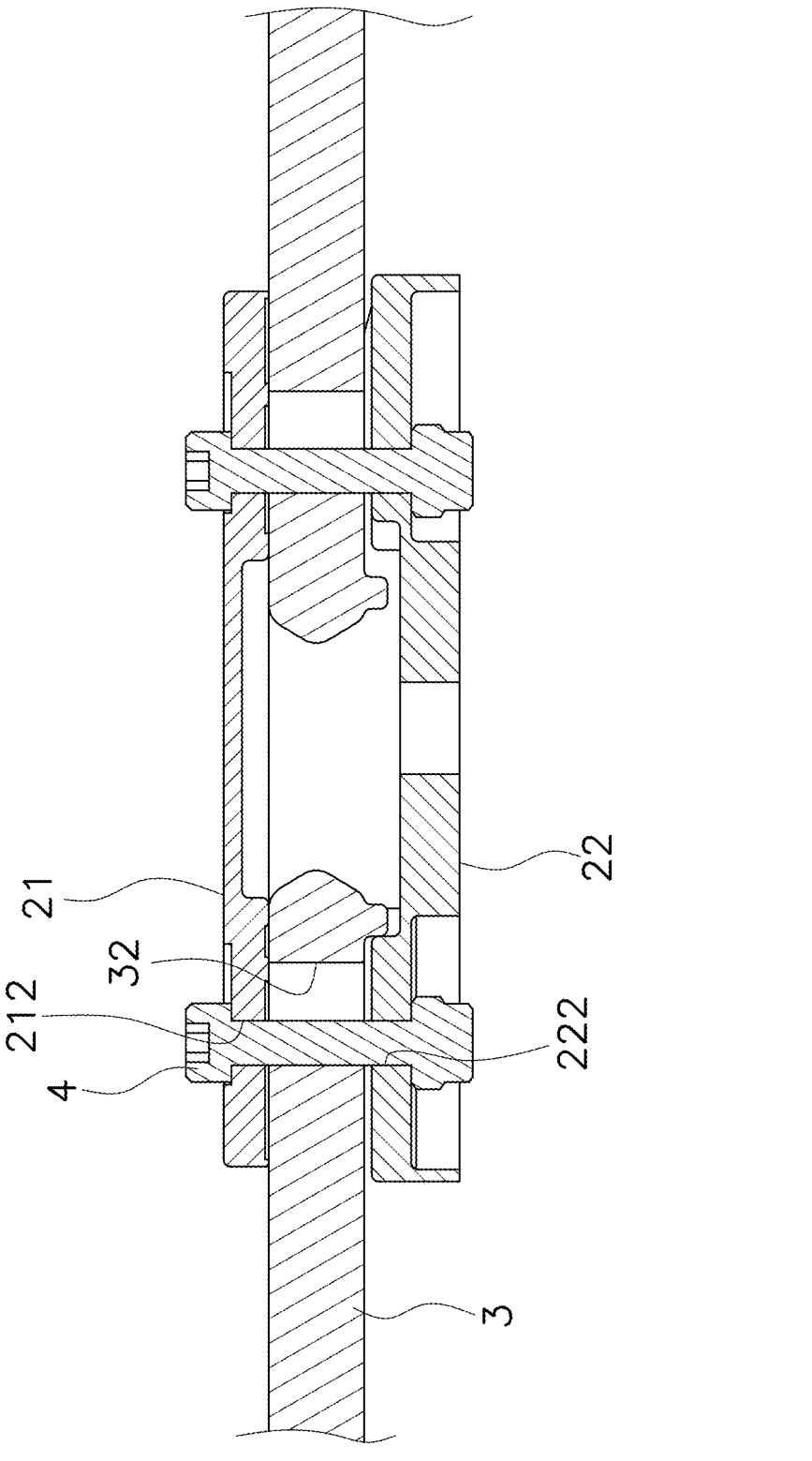
FIG. 8 is a cross-sectional view of the central, hub region of a propeller according to another modification.

(d) In the preferred embodiment described above, each bolt 4 axially extends from each blade 3; besides, the hub 2 is provided with the elongated holes 211 and 221. However, the propeller 105 is not limited in configuration to this. For example, as shown in FIG. 8, each bolt 4 may axially extend from the upper hub portion 21 and the lower hub portion 22; additionally, each blade 3 may be provided with an elongated hole 32. In this case, the upper hub portion 21 includes a through hole 212, while the lower hub portion 22 includes a through hole 222; additionally, each bolt 4 is fittingly engaged with the through hole 212 of the upper hub portion 21 and the through hole 222 of the lower hub portion 22. Because of this, each bolt 4 is radially immovable with respect to the hub 2. It should be noted that each blade 3 is radially movable with respect to each bolt 4.

(e) In the preferred embodiment described above, each bolt 4 has been exemplified as the pivot shaft; however, the pivot shaft may not be each bolt 4. For example, instead of each bolt 4, a pin may extend from each blade 3 in the up-and-down direction. In this case, the pin may be provided as a member separated from each blade 3, or alternatively, may be integrated with each blade 3 as a single member.

Figure 9:
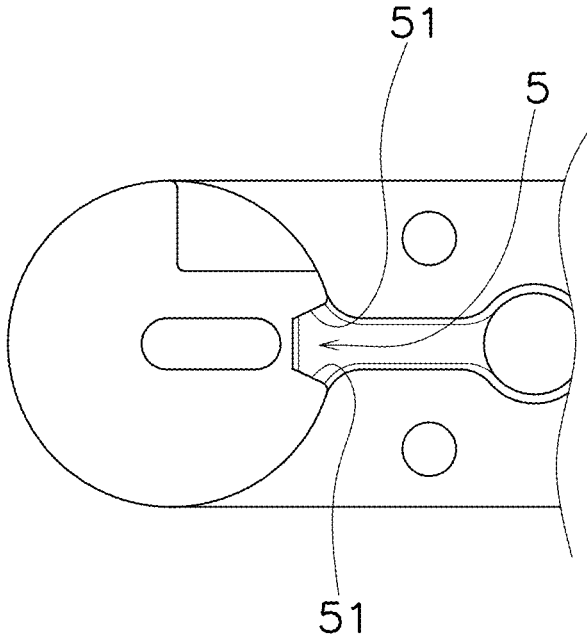
FIG. 9 is a plan view of a lower hub portion according to yet another modification.

(f) The recess, provided as each first engaging portion 5, may not be limited in shape to that described in the preferred embodiment described above and may be shaped in a variety of forms. For example, as shown in FIG. 9, the pair of inner wall surfaces 51, by which the recess provided as each first engaging portion 5 is defined, may slant to gradually separate from each other toward each second engaging portion 6. In this case, the lateral surfaces of the protrusion provided as each second engaging portion 6 also slant in comparable manner to the pair of inner wall surfaces 51.

(g) In the preferred embodiment described above, the hub 2 includes the upper hub portion 21 and the lower hub portion 22; however, the hub 2 is not limited in configuration to this. For example, the hub 2 may include only the upper hub portion 21 without including the lower hub portion 22.

(h) In the preferred embodiment described above, the propeller 105 includes the pair of first engaging portions 5 and the pair of second engaging portions 6. However, the first engaging portions 5 are not limited in number to this; likewise, the second engaging portions 6 are not limited in number to this as well. For example, the number of the first engaging portions 5 may be three or more; likewise, the number of the second engaging portions 6 may be three or more.

LIST OF REFERENCE NUMERALS

2: Hub, 21: Upper hub portion, 211: Elongated hole, 22: Lower hub portion, 221: Elongated hole, 3: Blade, 4: Bolt, 5: First engaging portion, 51: Inner wall surface, 6: Second engaging portion, 100: Rotorcraft, 104: Electric motor, 105: Propeller

The invention claimed is:

1. A propeller, comprising:
   a hub;
   a blade attached to the hub to be pivotable and radially movable with respect thereto;
   a first engaging portion provided in the hub; and
   a second engaging portion provided in the blade, the second engaging portion configured to be engaged with the first engaging portion to restrict the blade from pivoting with respect to the hub when the blade is moved radially outward, when engaged with the first engaging portion, the second engaging portion configured to overlap the first engaging portion when viewed in an axial direction, the second engaging portion configured to be disengaged from the first engaging portion when the blade is moved radially inward, when disengaged with the first engaging portion, the second engaging portion configured not to overlap the first engaging portion when viewed in the axial direction.

2. The propeller according to claim 1, wherein the hub includes an upper hub portion disposed on an upper side of the blade.

3. The propeller according to claim 2, wherein the first engaging portion is provided in the upper hub portion.

4. The propeller according to claim 2, wherein the hub includes a lower hub portion disposed on a lower side of the blade.

5. The propeller according to claim 1, wherein the first engaging portion is provided in the hub as one of a recess and a protrusion, and the second engaging portion is provided in the blade as the other of the recess and the protrusion.

6. The propeller according to claim 5, wherein the protrusion extends in the axial direction, and the recess is recessed in the axial direction.

7. The propeller according to claim 5, wherein the recess includes a pair of inner wall surfaces opposed to each other, and the pair of inner wall surfaces slant to gradually separate from each other toward the protrusion.

8. The propeller according to claim 7, wherein the protrusion extends in the axial direction, and the recess is recessed in the axial direction.

9. The propeller according to claim 5, wherein the recess includes a pair of inner wall surfaces opposed to each other, and the pair of inner wall surfaces are substantially parallel.

10. The propeller according to claim 1, further comprising:
a pivot shaft axially extending from one of the hub and the blade, wherein
the other of the hub and the blade includes an elongated hole radially extending, the elongated hole guiding the pivot shaft such that the pivot shaft is made radially movable.

11. The propeller according to claim 10, wherein the elongated hole is a slot.

12. The propeller according to claim 10, wherein the pivot shaft axially extends from the hub, and the blade includes the elongated hole.

13. The propeller according to claim 12, wherein the elongated hole is a slot.

14. A rotorcraft comprising:
the propeller recited in claim 1; and
a prime mover configured to rotate the propeller.

* * * * *